United States Patent Office 2,710,867
Patented June 14, 1955

2,710,867

NEW 2-AMINO-4-PYRIMIDOL DERIVATIVES

Kurt J. Rorig, Evanston, and Robert T. Nicholson, Glenview, Ill., assignors to G. D. Searle & Co., Chicago, Ill., a corporation of Illinois No Drawing. Application March 12, 1954,
Serial No. 415,968

7 Claims. (Cl. 260—256.4)

Our present invention relates to a new group of pyrimidine derivatives and, more specifically, to 2-amino-4-pyrimidols substituted in the 5-position by an alkyl or alkenyl radical and in the 6-position by a heterocyclyl radical.

Specifically, our invention provides compounds of the general structural formula

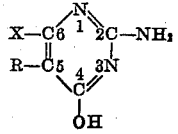

wherein X is a member of the class consisting of furyl, thienyl and pyridyl radicals and R is a member of the class consisting of lower alkyl and lower alkenyl radicals.

In the foregoing structural formula, the radical X is an aromatic heterocyclyl radical containing an oxygen, sulfur, or nitrogen heteroatom. Preferred for the purposes of this invention are furyl, thienyl and pyridyl radicals. The radical R can represent a lower alkyl radical such as methyl, ethyl, straight- and branched-chain propyl, butyl, amyl, and hexyl or a lower alkenyl radical such as allyl, methallyl, crotyl, pentenyl, hexenyl, and the like.

The compounds of our invention provide valuable cardiovascular agents and, particularly, compounds with ameliorative properties in hypertension. Also the compounds in which the radical R is a lower alkyl or a lower alkenyl radical improve the sodiouretic function of the kidney. The compounds of our invention are also valuable as intermediates in the organic synthesis of other valuable cardiovascular drugs.

Thus, treatment with phosphorus oxychloride converts the hydroxyl group in the 4-position to a chloro group. Treatment of these 4-chloro compounds with alkali metal alcoholates yields alkoxides of the formula

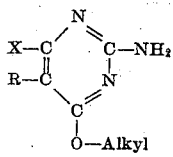

Heating of the 2-amino-4-chloropyrimidines with ammonia yields the corresponding 2,4-diamines of the structural formula

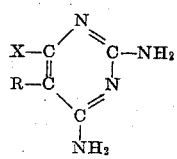

Replacement of ammonia in this reaction by lower alkyl amines and lower dialkyl amines yields compounds of the type

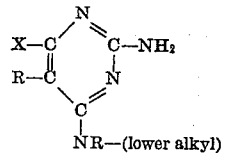

wherein R is hydrogen or a lower alkyl radical.

The compounds of our invention form salts with a variety of inorganic and strong organic acids including sulfuric, phosphoric, hydrochloric, hydrobromic, sulfamic, citric, ascorbic and related acids.

For the preparation of the compounds of our invention we prefer to heat a simple acid addition salt of guanidine with a lower alkyl ester of an α-heterocycloylalkanoic acid or α-heterocycloylalkenoic acid in an anhydrous solvent such as a lower alkanol according to the following reaction scheme

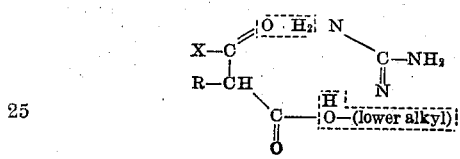

Where more vigorous reaction conditions are required, such alkaline condensing agents as sodium methoxide are advantageously used.

The following examples illustrate in further detail some of the compounds which constitute our invention and methods for their synthesis. However, our invention is not to be construed as limited thereby in spirit or in scope. In these examples temperatures are indicated in degrees centigrade (° C.), pressures in millimeters (mm.) of mercury, and quantities of materials in parts by weight.

Example 1

In a reaction vessel equipped with an efficient stirrer and a drying tube, 807 parts of the ethyl ester of acetoacetic acid are added slowly to a solution of 143 parts of sodium in 1720 parts of ethanol. Then 463 parts of thenoyl chloride in 530 parts of ether are added slowly, while the temperature is maintained below 12° C. At the same temperature there are added, under anhydrous conditions and with vigorous stirring, alternately 5 portions each of a total of 142 parts of sodium dissolved in 1720 parts of ethanol and 462 parts of thenoyl chloride. The reaction mixture is then stored at 0° C. for 8 hours after which the yellow sodium salt is collected on a filter and washed with dry ether.

1292 parts of the sodium salt thus obtained are suspended in 6950 parts of water and stirred for 3 hours at 40–50° C. with 347 parts of ammonium chloride and 630 parts of concentrated ammonia. After cooling, the reaction mixture is extrated with ether. This ether extract is dried over anhydrous sodium sulfate, filtered and evaporated to yield the ethyl ester of 2-thenoylacetic acid.

Example 2

Under anhydrous conditions and with efficient stirring, a solution of 69 parts of sodium in 1150 parts of ethanol is treated first with 586 parts of the ethyl ester of 2-thenoylacetic acid and then, in the course of 90 minutes, at gentle reflux temperature with 610 parts of iodomethane. Refluxing is continued for 12 hours, the solvent is removed by distillation after which 125 parts each of water and benzene are added. The organic layer is separated, washed with 5% aqueous sodium hydroxide solution and then evaporated to yield the ethyl ester of 2-(2'-thenoyl)propionic acid.

Example 3

A mixture of 600 parts of the ethyl ester of 2-(2'-thenoyl)propionic acid, 265 parts of guanidine carbonate, and 1500 parts of ethanol is stirred and refluxed under anhydrous conditions for eight hours, cooled to room temperature and treated with solid carbon dioxide. The precipitate is slurried in boiling water, cooled and again collected on a filter. The 2-amino-5-methyl-6-(2'-thienyl)-4-pyrimidol thus obtained melts at about 293–294° C. and has the structural formula

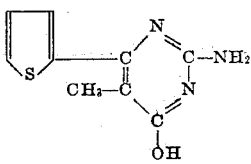

Example 4

To a solution of 23 parts of metallic sodium in 400 parts of ethanol, 198 parts of the ethyl ester of thenoylacetic acid are added. Upon exclusion of moisture and with stirring, the reaction mixture is maintained at gentle reflux while 176 parts of allyl iodide are added in the course of 30 minutes. Refluxing is continued for 6 additional hours after which the ethanol is removed under vacuum and the residue is treated with 500 parts of water and 500 parts of benzene. The organic layer is separated, washed with water, dried over anhydrous sodium sulfate and evaporated. On vacuum distillation at about 0.5 mm. pressure, the ethyl ester of 2-thenoyl-4-pentenoic acid is collected at about 105–115° C.

A solution of 95 parts of this distillate, 38 parts of guanidine carbonate and 200 parts of ethanol is refluxed under exclusion of moisture for 12 hours, chilled and saturated with solid carbon dioxide. The solid precipitate is collected on a filter, suspended in boiling water and chilled. There is thus obtained 2-amino-5-allyl-6-(2'-thienyl)-4-pyrimidol of the structural formula

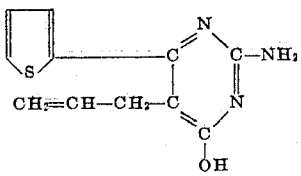

Substitution of 136 parts of methallyl chloride for the allyl iodide used in the above process yields 2-amino-5-methallyl-6-(2'-thienyl)-4-pyrimidol of the structural formula

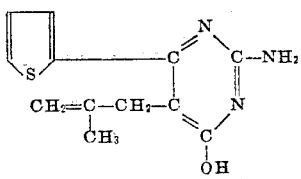

Example 5

To a stirred solution of 285 parts of magnesium ethoxide in 1340 parts of anhydrous ether, there are added slowly 470 parts of ethyl t-butyl malonate. After 15 minutes of refluxing, 360 parts of furoyl chloride in 450 parts of dry ether are added to the cloudy, still refluxing solution. The mixture is chilled, treated with 630 parts of water and acidified with dilute sulfuric acid. The etheric layer is separated, dried over sodium sulfate, and freed from solvent by vacuum distillation. The residue is dissolved in 2000 parts of dry benzene and then heated in a water separator to make the solution completely anhydrous. 25 parts of p-toluene sulfonic acid are then added and refluxing is resumed until gas evolution ceases. After cooling, the solution is extracted with saturated aqueous sodium bicarbonate solution, dried over anhydrous sodium sulfate and concentrated under vacuum. The residual ethyl ester of 2-furoylacetic acid is obtained by vacuum distillation at 86–89° C. and about 0.5 mm. pressure.

A mixture of 199 parts of the above distillate, 104 parts of guanidine carbonate and 570 parts of ethanol is heated under reflux for 10 hours with stirring, cooled and treated with solid carbon dioxide. 2-amino-6-furyl-4-pyrimidol crystals are collected on a filter, washed with a small amount of ice-cold ethanol and dried. The product sinters at about 315° C. and melts with decomposition at about 325° C. It has the structural formula

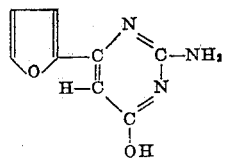

Example 6

An anhydrous solution of 69 parts of sodium in 1150 parts of ethanol is treated with 552 parts of the ethyl ester of 2-furoylacetic acid and then, in the course of 90 minutes, with 610 parts of iodomethane at gentle reflux temperature. Refluxing is continued for 15 hours, the solvent is removed by distillation, and 1250 parts each of water and benzene are added. The organic layer is separated, dried over anhydrous sodium sulfate and freed from solvent by vacuum distillation. The residue is distilled at 0.2 mm. pressure. The ethyl ester of 2-(2'-furoyl)propionic acid is collected at about 77–79° C.

A mixture of 470 parts of this ester, 227 parts of guanidine carbonate and 1200 parts of ethanol is refluxed for 12 hours and then chilled. The precipitate is collected on a filter and suspended in water which is brought to boiling temperature. After chilling, the 2-amino-5-methyl-6-(2'-furyl)-4-pyrimidol is collected on a filter, washed with ice-cold water and dried. It melts at about 290–291° C. with decomposition. It has the structural formula

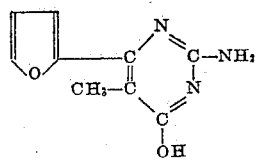

Example 7

A solution of 14 parts of sodium in 250 parts of anhydrous ethanol is treated first with 110 parts of the ethyl ester of 2-furoylacetic acid and then in the course of 2 hours at gentle reflux temperature with 146 parts of 1-iodopropane. The mixture is refluxed for 15 hours, the solvent is removed by distillation, and the residue is treated with 250 parts each of water and benzene. The organic layer is separated, dried over anhydrous sodium sulfate, filtered, and freed from solvent by vacuum distillation. The residue is then distilled at about 0.2 mm. pressure. The ethyl ester of 2-(2'-furoyl)pentanoic acid is collected at about 98–106° C.

In a reaction vessel equipped with a reflux condenser and a drying tube, a mixture of 110 parts of this ester, 45 parts of guanidine carbonate and 250 parts of ethanol is refluxed for 12 hours after which the reaction mixture is stored at 0° C. for 24 hours. The resulting precipitate is collected on a filter, and suspended in boiling water. On cooling, one obtains the 2-amino-5-n-propyl-6-(2'-furyl)-4-pyrimidol which is collected on a filter, washed with ice-cold water and dried. It has the structural formula

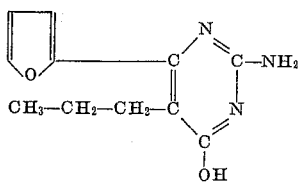

*Example 8*

A stirred solution of 55 parts of sodium in 920 parts of ethanol is treated under anhydrous conditions first with 473 parts of the ethyl ester of picolinoylacetic acid and then in the course of 90 minutes under gentle reflux with 483 parts of iodomethane. Refluxing is continued for 15 hours. The solvent is removed by distillation, after which a mixture of water and benzene is added. The organic layer is separated, dried over anhydrous sodium sulfate and evaporated. The ethyl ester of 2-(2'-picolinoyl)propionic acid thus obtained is distilled at about 90–92° C. and 0.3 mm. pressure.

A mixture of 402 parts of this distillate, 180 parts of guanidine carbonate and 1000 parts of ethanol is refluxed under anhydrous conditions for 8 hours, cooled and filtered. The material collected on the filter is slurried in boiling water, cooled and filtered. There is thus collected 2-amino-5-methyl-6-(2'-pyridyl)-4-pyrimidol which melts at about 283–284° C. with decomposition. The compound has the structural formula

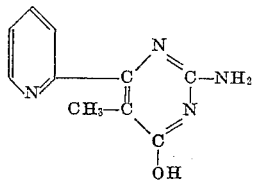

*Example 9*

A mixture of 62 parts of sodium in 1050 parts of ethanol, 529 parts of the ethyl ester of nicotinoylacetic acid and 539 parts of iodomethane are reacted by the method of Example 2. The ethyl ester of 2-nicotinoyl-propionic acid thus obtained is distilled at 102–104° C. and 0.4 mm. pressure. A mixture of 270 parts of the distillate, 123 parts of guanidine carbonate and 650 parts of ethanol is stirred and refluxed under anhydrous conditions for 10 hours and then cooled. The precipitate is separated by filtration, slurried in boiling water and cooled. There is thus obtained 2-amino-5-methyl-6-(3'-pyridyl)-4-pyrimidol which melts at 282–284° C. with decomposition.

*Example 10*

Reaction of 154 parts of sodium in 2550 parts of ethanol, 1286 parts of the ethyl ester of isonicotinoylacetic acid and 1334 parts of iodomethane by the method of Example 2 yields the ethyl ester of 2-isonicotinoyl-propionic acid which is distilled at about 92–95° C. and 0.3 mm. pressure. Under anhydrous conditions, a mixture of 81 parts of this distillate, 38 parts of guanidine carbonate and 200 parts of ethanol is heated at reflux temperature for 12 hours and then cooled to 0° C. The precipitate is separated by filtration and slurried in boiling water. On cooling there is obtained 2-amino-5-methyl-6-(4'-pyridyl)-4-pyrimidol which melts at about 315–316° C. with decomposition.

We claim:
1. A compound of the structural formula

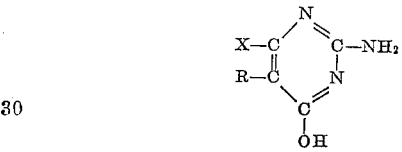

wherein X is a member of the class consisting of furyl, thienyl and pyridyl radicals and R is a member of the class consisting of lower alkyl and lower alkenyl radicals.
2. A 2-amino-5-(lower alkyl)-6-thienyl-4-pyrimidol.
3. 2-amino-5-methyl-6-thienyl-4-pyrimidol.
4. A 2-amino-5-(lower alkyl)-6-furyl-4-pyrimidol.
5. 2-amino-5-methyl-6-furyl-4-pyrimidol.
6. A 2-amino-5-(lower alkyl)-6-pyridyl-4-pyrimidol.
7. 2-amino-5-methyl-6-pyridyl-4-pyrimidol.

References Cited in the file of this patent

Andrisano: Boll. Sci. Facolta Chim. Ind. Univ. Bologna 5, 42–44 (1944–1947), cited in Chem. Abst 44, 3905a (1950).